United States Patent
Itoh

(10) Patent No.: US 9,467,615 B2
(45) Date of Patent: Oct. 11, 2016

(54) IMAGING APPARATUS INCLUDING DYNAMIC IMAGE FOCUS DETECTION

(71) Applicant: RICOH IMAGING COMPANY, LTD., Tokyo (JP)

(72) Inventor: Kei Itoh, Kanagawa (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 91 days.

(21) Appl. No.: 14/168,278

(22) Filed: Jan. 30, 2014

(65) Prior Publication Data

US 2014/0211080 A1   Jul. 31, 2014

(30) Foreign Application Priority Data

Jan. 31, 2013 (JP) ................. 2013-017633

(51) Int. Cl.
*H04N 5/232* (2006.01)
*G03B 13/36* (2006.01)
*G02B 7/28* (2006.01)

(52) U.S. Cl.
CPC .......... *H04N 5/23212* (2013.01); *G02B 7/285* (2013.01); *G03B 13/36* (2013.01); *H04N 5/23293* (2013.01)

(58) Field of Classification Search
CPC ............. H04N 5/232; H04N 5/23212; H04N 5/23293
See application file for complete search history.

(56) References Cited

U.S. PATENT DOCUMENTS

| | | | | |
|---|---|---|---|---|
| 2001/0028402 A1* | 10/2001 | Sugimoto | .......... | H04N 5/23212 348/345 |
| 2003/0048372 A1* | 3/2003 | Yasuda | .......... | G02B 7/102 348/349 |
| 2005/0036774 A1* | 2/2005 | Katagishi | .......... | G03B 5/00 396/55 |
| 2006/0051070 A1* | 3/2006 | Itsukaichi | .......... | H04N 5/772 386/229 |
| 2006/0238641 A1 | 10/2006 | Konishi | | |
| 2010/0073549 A1* | 3/2010 | Sekine | .......... | G03B 13/32 348/345 |
| 2010/0209094 A1 | 8/2010 | Uehara | | |
| 2011/0176795 A1* | 7/2011 | Won | .......... | G02B 7/102 396/133 |
| 2011/0211822 A1 | 9/2011 | Kikuchi | | |
| 2011/0305446 A1 | 12/2011 | Itoh | | |
| 2012/0050556 A1* | 3/2012 | Hamada | .......... | H04N 5/23212 348/220.1 |

(Continued)

FOREIGN PATENT DOCUMENTS

| JP | 2010-170001 | 8/2010 |
|---|---|---|
| JP | 4886210 | 12/2011 |
| JP | 2012-002951 | 1/2012 |

OTHER PUBLICATIONS

Search report from E.P.O., mail date is May 9, 2014.

*Primary Examiner* — Abdelaaziz Tissire
(74) *Attorney, Agent, or Firm* — Greenblum & Bernstein P.L.C.

(57) ABSTRACT

An imaging apparatus is provided that includes an image sensor that receives light from an object through an imaging lens, a lens driver that moves the imaging lens, and an automatic focus detector that determines an in-focus lens position based on imaging data obtained from the image sensor, the automatic focus detector being capable of performing a focus detection operation with a second switch that is different from a release switch in that it includes a dynamic-image focus detector and a still-image focus detector, and the dynamic-image focus detector further including a focus detection operation selector that varies a focus detection operation controlled by the second switch in accordance with whether a video is being recorded.

16 Claims, 22 Drawing Sheets

(56) References Cited

U.S. PATENT DOCUMENTS

2012/0154616 A1* 6/2012 Sato .................. G02B 7/38
348/220.1

2012/0327274 A1* 12/2012 Taguchi ................. H04N 5/232
348/240.2

* cited by examiner

NORMAL AF MODE

SPOT AF MODE

FOCUSED

NON-FOCUSED

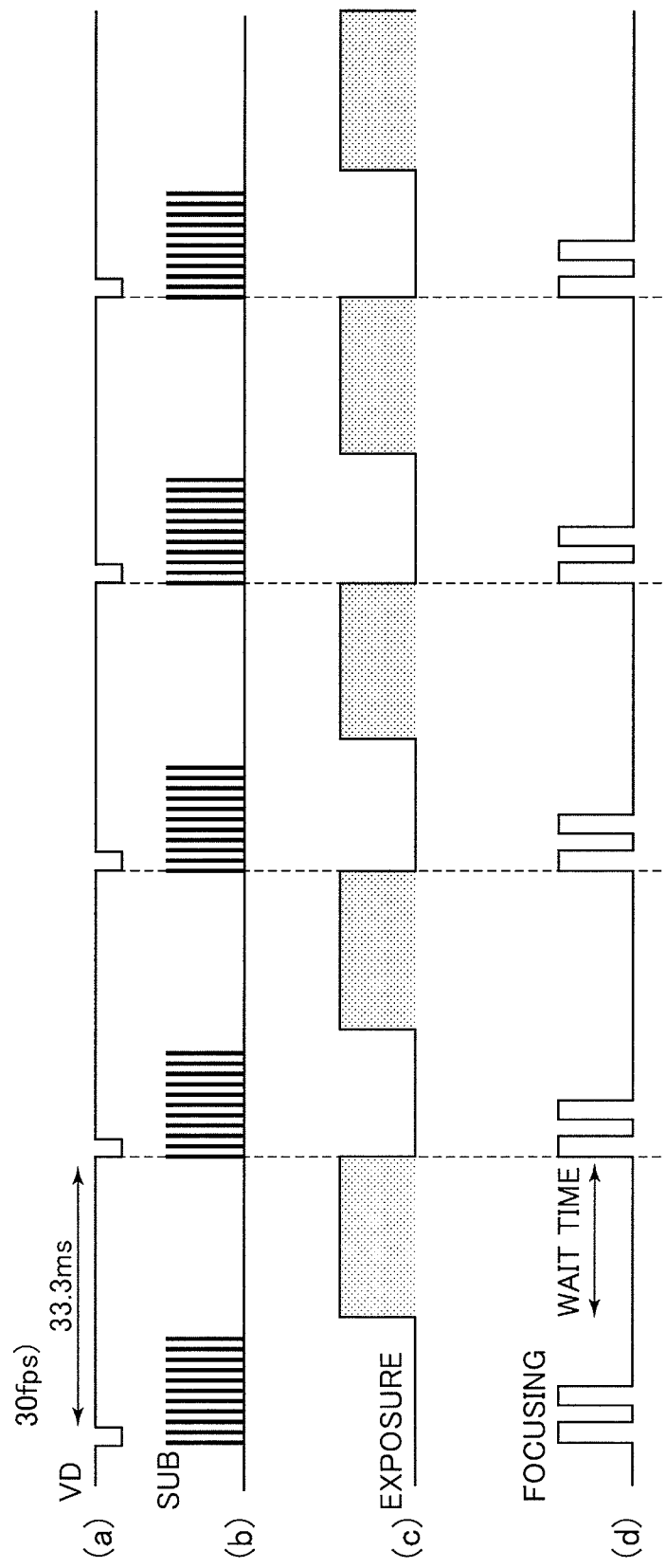

FIG. 15

|  | AF BUTTON ||
| --- | --- | --- |
|  | ON | OFF |
| AFL | (1) ON/OFF | --- |
| AFC | (2) ON/OFF | --- |

MAINTAIN MODE ON

|  | AF BUTTON ||
| --- | --- | --- |
|  | ON | OFF |
| AFL | (1) ON | (3) OFF |
| AFC | (2) ON | (4) OFF |

MAINTAIN MODE OFF

FIG. 17

|  | AF BUTTON ||
|  | ON | OFF |
| --- | --- | --- |
| AFL | (1) ON/RESTART | --- |
| AFC | (2) AFRESH N. AF | --- |

MAINTAIN MODE ON

|  | AF BUTTON ||
|  | ON | OFF |
| --- | --- | --- |
| AFL | (1) STOP | (3) RESTART |
| AFC | (2) AFRESH N. AF | --- |

MAINTAIN MODE OFF

FIG. 20

|  | AF BUTTON | |
|---|---|---|
|  | ON | OFF |
| AFL | (1) STOP/REST. | --- |
| AFC | (2) TRAC. AF/CANC. | --- |

MAINTAIN MODE ON

|  | AF BUTTON | |
|---|---|---|
|  | ON | OFF |
| AFL | (1) STOP | (3) RESTART |
| AFC | (2) TRAC. AF | (4) CANCEL |

MAINTAIN MODE OFF

FIG. 22
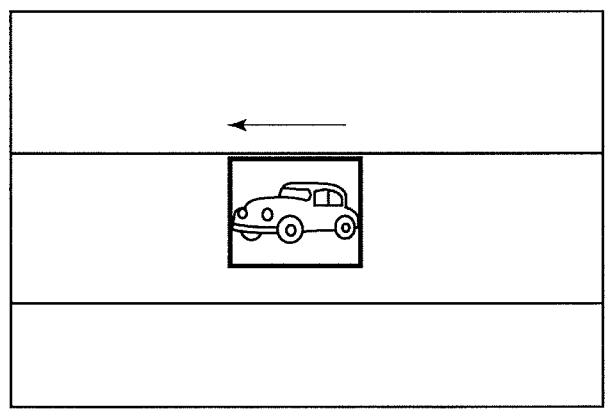
(a) TRACKING TARGET
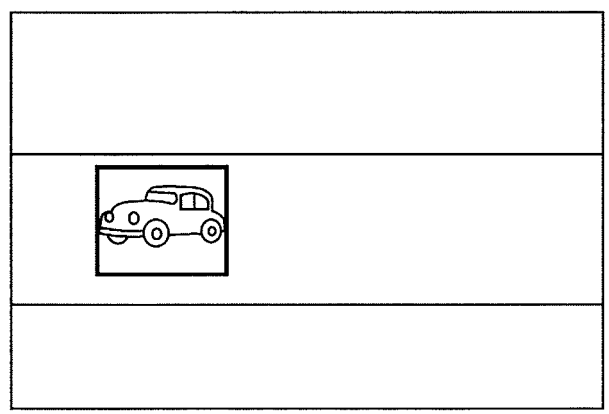
(b) TRACKING TARGET

FIG. 23
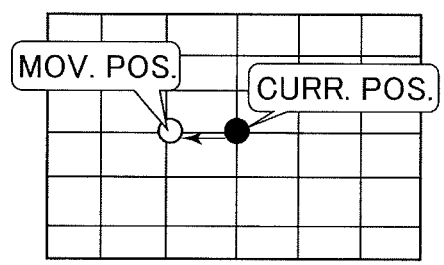
(a) TRACKING POSITION MOVEMENT
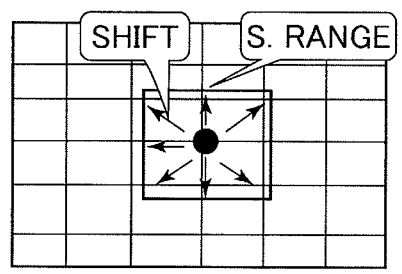
(b) DIRECTION/RANGE OF TRACKING SEARCH
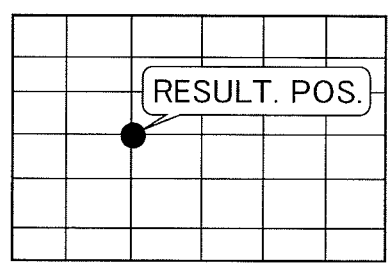
(c) TRACKING RESULT

SCENE 1

SCENE 2

IMAGING APPARATUS INCLUDING DYNAMIC IMAGE FOCUS DETECTION

BACKGROUND OF THE INVENTION

1. Field of the Invention

The present invention relates to an imaging apparatus, and in particular, it relates to an imaging function of a portable device such as a digital camera, a camera-equipped cellular phone, or PDA.

2. Description of the Related Art

Recently, commonly used digital still cameras have been capable of recording videos similar to video cameras, and further, capable of performing automatic focusing (AF) during recording. However, bothersome adjustments to settings are often required for functions that can be obtained naturally by a digital still camera, such as focusing control for example, to fix focusing on an AF result (fixed focusing). Accordingly, it has been desired to improve operability thereof.

FIGS. 24A and 24B illustrate an example of the above situation. In the case of FIG. 24A, when a target object moves away from the center of the image area, a far-focus state (being focused on background of image area) is obtained when an AF area is set at the center. In the case of FIG. 24B, the target object is a doll at the right side of the image area. However, since the digital still camera cannot recognize whether to focus on the doll at the right side or the background in the center, a far-focus state (being focused on background) is obtained.

In Kokai No. 2006-301378, angular field variation caused in focus operation during video recording is suppressed by narrowing a scanning area compared to a scanning area set in a still image capture. However, this method is not sufficient for performing a focusing operation suitable for an environment such as the abovementioned fixed focusing. In Kokai No. 2012-002951, an object is tracked and focused upon by changing an AF area during a focus operation carried out in a still image capture.

Further, some conventional digital cameras include a dedicated AF button (hereinafter, called AF button). In this configuration, an AF operation performed during imaging is controlled by a button that is separate from the release switch while a normal conventional AF operation is performed in conjunction with a release switch operation.

SUMMARY OF THE INVENTION

However, according to the above structure, the apparatus is not operationally user-friendly because a function of the AF button overlaps with the release switch and is not separate therefrom.

Therefore, one aspect of the present invention is to improve usability of an imaging apparatus by expanding functions of an AF button during, before and after video recording and in still image capturing.

According to one aspect of the present invention, there is provided an imaging apparatus including an image sensor that receives light from an object through an imaging lens, a lens driver that moves the imaging lens, and an automatic focus detector which determines a lens in-focus position based on imaging data obtained from the image sensor, the automatic focus detector being capable of performing a focus detection operation with a second switch, which is different from a release switch, in that it includes a dynamic-image focus detector and a still-image focus detector, and the dynamic-image focus detector further including a focus detection operation selector that varies the focus detection operation controlled by the second switch in accordance with whether a video is being recorded.

According to the present invention, it is possible to provide an imaging apparatus, which has a dedicated AF button with expanded functions, that is user-friendly during, before and after video-image recording and during still-image recording or capturing. By providing an AF button with different operations based on whether video-image or still-image recording is underway, it becomes easy to further improve operability of an AF operation process that is required during each recording mode.

BRIEF DESCRIPTION OF THE DRAWINGS

The objects and advantages of the present invention will be better understood from the following description, with reference to the accompanying drawings in which:

FIG. 9 is a timing chart indicating frame cycles, sweeping pulses, and focusing;

FIG. 15 is a table indicating a normal AF button operation;

FIG. 17 is a table indicating an AF button operation during dynamic imaging in the first embodiment;

FIG. 20 is a table illustrating an AF button operation during dynamic imaging according to a second embodiment of the present invention;

FIG. 22 is a view illustrating an object-tracking operation according to the second embodiment;

FIG. 23 is a view illustrating an object-tracking operation according to the second embodiment.

DESCRIPTION OF THE PREFERRED EMBODIMENTS

Figure 1:
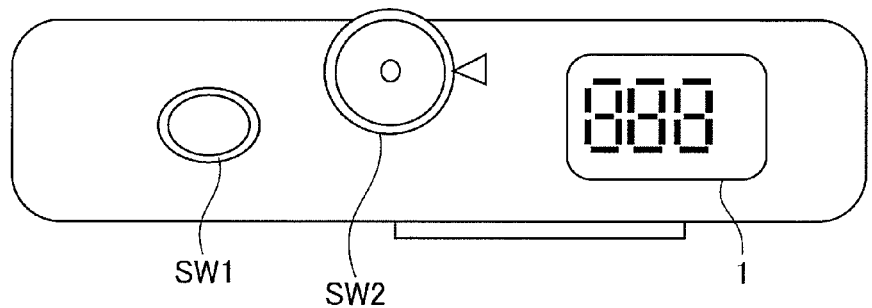
FIG. 1 is a top view of a camera to which a first embodiment of the present invention is applied.

The present invention is described below with reference to the embodiments of an imaging apparatus and an imaging method shown in the drawings.

Figure 2:
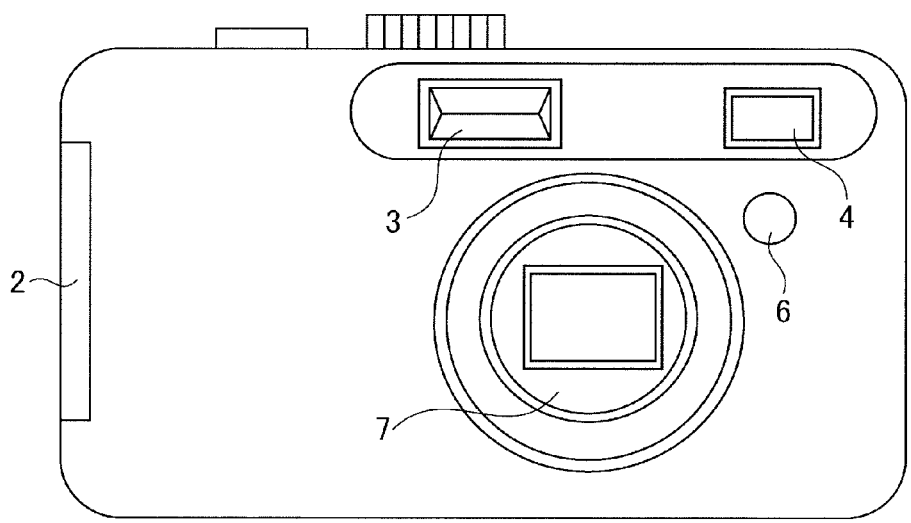
FIG. 2 is a front view of the camera to which the first embodiment of the present invention is applied.
Figure 3:
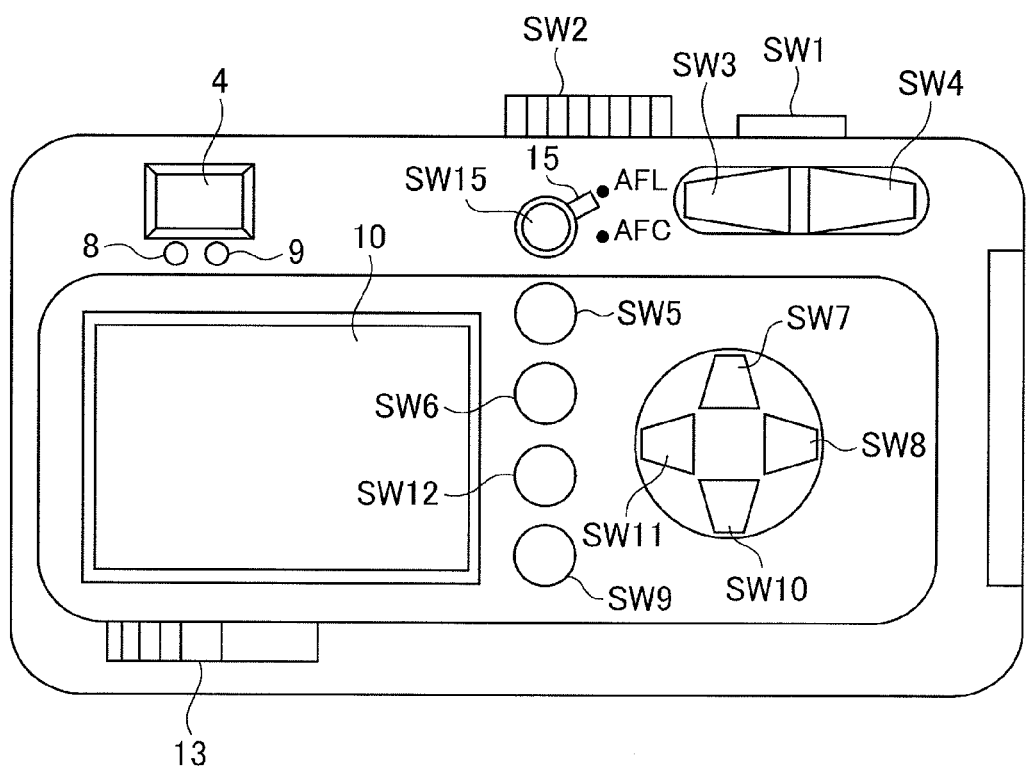
FIG. 3 is a rear view of the camera to which the first embodiment of the present invention is applied.
Figure 4:
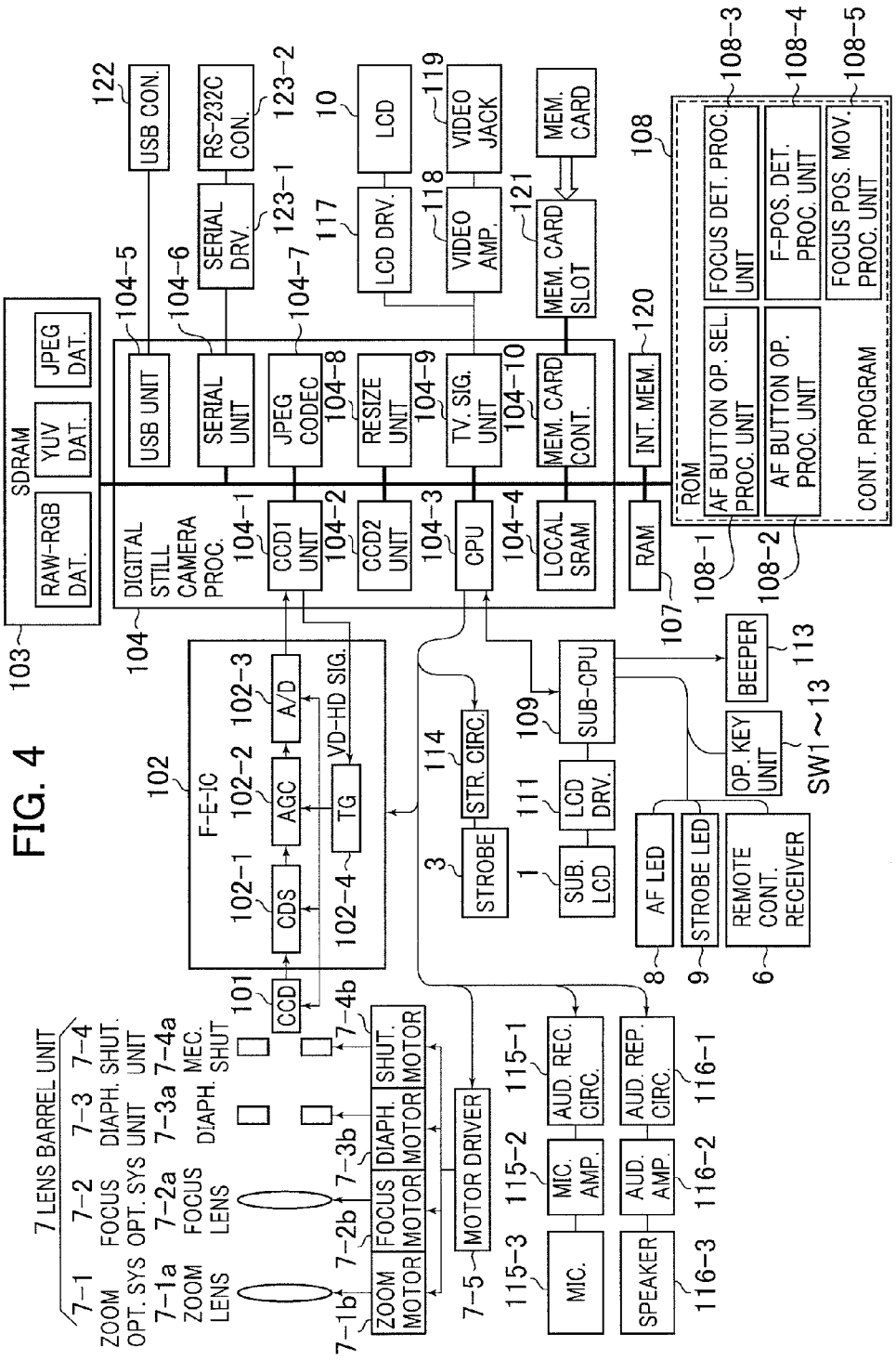
FIG. 4 is a block diagram illustrating an electric structure of the camera of FIG. 1.

FIGS. 1 to 3 are a top view, a front view, and a rear view illustrating an example of a digital still camera, which is an example of an imaging apparatus according to the present invention. FIG. 4 is a block diagram illustrating an outline of an example of an internal system configuration of the digital still camera.

As illustrated in FIG. 1, an upper face of a camera is provided with a release switch SW1, a mode dial SW2, and a subsidiary liquid crystal display (LCD) (hereinafter, called sub-LCD) 1. As illustrated in FIG. 2, a front face of the camera is provided with a lens barrel unit 7 including an imaging lens, an optical finder 4, a strobe-emitting portion 3, a remote control receiving portion 6, and a cover 2 for a memory card and battery enclosure.

As illustrated in FIG. 3, a rear face of the camera is provided with a power switch 13, an LCD monitor 10, an automatic focusing LED (AF LED) 8, a strobe LED 9, an optical finder 4, a widening zoom switch SW3, an enlarging zoom switch SW4, a self-timer control switch SW5, a menu switch SW6, a switch SW7 for panning upward and setting the strobe, a switch SW8 for panning rightward, a display switch SW9, a switch SW10 for panning downward and setting macro mode, a switch SW11 for panning leftward and image confirmation, an OK switch SW12, an AF button switch (second switch) SW15, and an AF lever 15.

The internal system configuration of the digital still camera is as follows. As illustrated in FIG. 4, each portion of the digital still camera is controlled by a digital still camera processor 104 (hereinafter, simply called the processor 104).

The processor 104 includes a CCD1 signal processing unit 104-1, a CCD2 signal processing unit 104-2, a CPU 104-3, a local SRAM 104-4, a USB unit 104-5, a serial unit 104-6, a JPEG-CODEC unit 104-7, a RESIZE unit 104-8, a TV signal display unit 104-9, and a memory card controller unit 104-10. These are mutually connected by a bus line.

An SDRAM 103, which stores RAW-RGB image data, YUV image data, and JPEG image data, is arranged outside the processor 104 and is connected to the processor 104 by a bus line. Further, a RAM 107, an internal memory 120, and a ROM 108 in which a control program is stored are arranged outside the processor 104 and are connected to the processor 104 by a bus line. The CCD1 signal processing unit 104-1 controls a control signal for image sensor operation as well as white balance processing and gamma control processing. The CCD2 signal processing unit 104-2 performs processing such as YC conversion.

Figure 5:
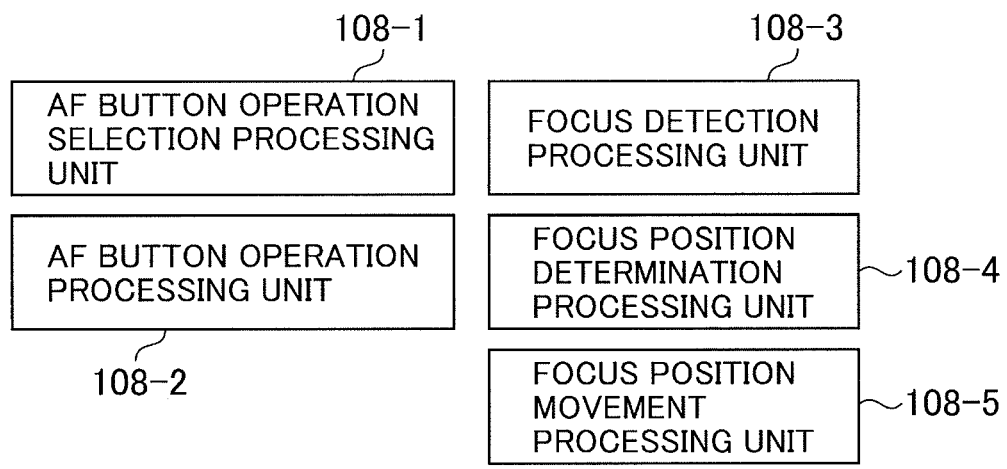
FIG. 5 is a diagram illustrating a control program of FIG. 4.

The control program is configured with five processing units as illustrated in FIG. 5. An AF button operation selection processing unit (focus detection operation selector) 108-1 may perform an operation process of the focus detection operation selector in claim 1. Further, an AF button operation processing unit (a discrete switch activation detector and continuous switch activation detector) 108-2 may perform operation processes of claims 4 to 6.

Further, a focus detection processing unit (dynamic-image focus detector and still-image focus detector) 108-3, a focus position determination processing unit 108-4, a focus position movement processing unit (automatic focus detector) 108-5 may perform operation processes of a focus detector in claim 1. Furthermore, operation processes of claims 6 and 7 may be performed in the AF button operation processing unit (continuous switch activation detector) 108-2.

The lens barrel unit 7 is provided with a zoom optical system 7-1 which includes a zoom lens 7-1a, a focus optical system 7-2 which includes a focus lens 7-2a, a diaphragm unit 7-3 which includes a diaphragm 7-3a, and a mechanical shutter unit 7-4 which includes a mechanical shutter 7-4a. The zoom optical system 7-1, the focus optical system 7-2, the diaphragm unit 7-3, and the mechanical shutter unit 7-4 are driven by a zoom motor 7-1b, a focus motor 7-2b, a diaphragm motor 7-3b, and a mechanical shutter motor 7-4b, respectively. The respective motors are controlled by a motor driver (lens driver) 7-5 which is controlled by the CPU 104-3 of the processor 104.

The lens barrel unit 7 includes the imaging lens which forms an object image on a CCD 101 image sensor. The CCD 101 converts the object image into an image signal and inputs the signal to an F/E-IC 102. As is well known, the F/E-IC 102, which includes a CDS circuit 102-1, an AGC 102-2, and an A/D converter 102-3, performs a predetermined process on the image signal, and inputs the signal to the CCD1 signal processing unit 104-1 of the processor 104 after converting it to a digital signal. The signal processing operations are controlled via a TG 102-4 with a VD/HD signal, which is output from the CCD1 signal processing unit 104-1 of the processor 104.

The CPU 104-3 of the processor 104 controls an audio recording operation which is performed by an audio recording circuit 115-1. In accordance with an instruction, the audio recording circuit 115-1 records an amplified signal, which is obtained by amplifying an audio signal converted by a microphone 115-3 with a microphone amplifier 115-2. The CPU 104-3 controls an operation of the audio reproducing circuit 116-1 as well. In accordance with an instruction, the audio reproducing circuit 116-1 reproduces an audio signal, which is recorded in an appropriate memory, inputs the signal to the audio amplifier 116-2, and outputs audio from a speaker 116-3.

Further, the CPU 104-3 controls the emission of illumination light from the strobe-emitting portion 3 by controlling an operation of a strobe circuit 114. Further, the CPU 104-3 controls an operation of a distance measuring unit.

The CPU 104-3 is connected to a sub-CPU 109, which is arranged outside the processor 104. The sub-CPU 109 controls displaying by the sub-LCD 1 via an LCD driver 111. Further, the sub-CPU 109 is connected to the AF LED 8, the strobe LED 9, the remote-control receiving portion 6, an operational key unit that includes the switches SW1 to SW13, and a beeper 113.

The USB 104-5 is connected to a USB connector 122. The serial unit 104-6 is connected to an RS-232C connector 123-2 via a serial driver circuit 123-1. The TV signal display unit 104-9 is connected to the LCD monitor 10 via an LCD driver and is connected to a video jack 119 via a video amplifier 118. The memory card controller unit 104-10 is connected to a contact point of a memory card slot 121 for a card connection.

Next, operations of the digital still camera, which is structured as described above, are described. An operational summary of a conventional digital still camera is also described. The camera is activated in a recording mode by setting the mode dial SW2 illustrated in FIG. 1 to the recording mode.

According to the setting of the mode dial SW2, the CPU detects that the mode switch SW2, which is included in the operational key unit in FIG. 4, is in a "recording mode ON state", so that the motor driver 7-5 is controlled to move the lens barrel unit 7 to a position where imaging can be performed. Further, power is supplied to respective portions such as the CCD 101, the F/E-IC 102, and the LCD monitor 10 is activated, so that operations thereof are started. When power is supplied to the respective portions, an operation in a finder mode is started.

In the finder mode, light entering the image sensor (CCD 101) through a lens is converted into an electric signal, and then, the signal is transmitted to the CDS circuit 102-1 and the A/D converter 102-3 as R, G, and B analog signals. Each signal converted into a digital signal at the A/D converter 102-3 is converted into a YUV signal in a digital signal processing IC (SDRAM 103), and the YUV signal is stored in a frame memory by a memory controller. The YUV signal is read out by the memory controller and is sent to a TV or the LCD monitor 10 via the TV signal display unit 104-9, so that an image is displayed. The above process is performed at intervals of 1/30 second, so that a display in the finder mode is updated at intervals of 1/30 second.

When the release switch SW1 is depressed, the CPU 104-3 calculates an AF evaluation value, which indicates a focusing degree of a screen, from digital RGB signals transmitted to a CCD I/F unit of the signal processing IC. The AF evaluation value data is read out by a microcomputer as characteristic data and is used for AF processing. Since edges of an object become sharp in a focused state, an integral value thereof contains the highest high-frequency component.

According to the above, during an AF focus detection operation, an AF evaluation value is obtained at each focus lens position to determine where the value is maximized (peak position). In consideration of a case that a plurality of peak positions exist, AF is performed with the focus position determined by the most reliable position among the plurality of peak positions, which is determined by evaluating the size of the evaluation values of the peak positions, and degree of their relative increase and decrease with respect to peripheral evaluation values.

Figure 6:
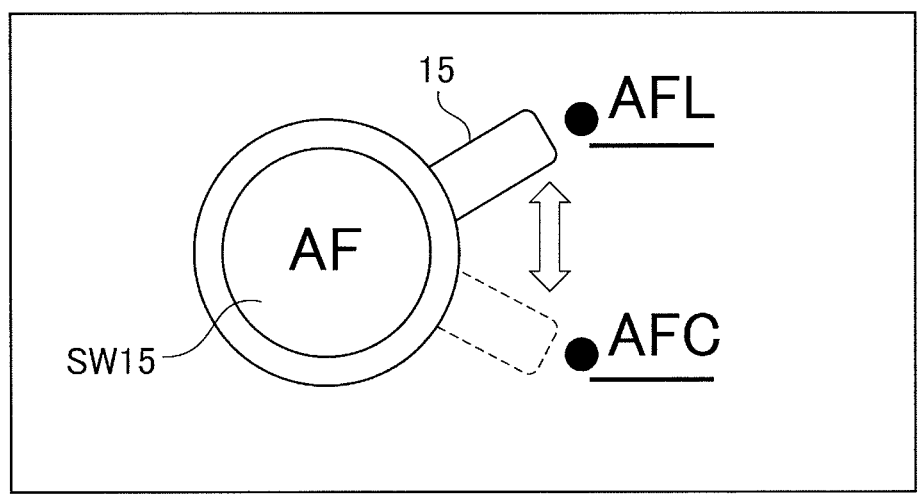
FIG. 6 is an enlarged view of an AF switch in FIG. 3.

When the AF button switch SW15 is depressed, an operation is performed that is partially different from the operation controlled by the release shutter switch SW1 in accordance with a position of the AF lever 15. FIG. 6 shows an enlarged view of the AF lever. The AF lever 15 has positions of AFL and AFC. AFL provides an AF lock function to fix a focus position after AF is performed. AFC provides a continuous AF function to continuously perform AF.

Further, the AF button switch SW15 provides, in a state of being continuously depressed, "a maintain mode" in which the AF operation can be set to be maintained as follows. In a case that the maintain mode is ON, the above state can be continuously maintained even after the AF button is released. In a case that the maintain mode is OFF, the operation can be continued only when the AF button is continuously depressed. The maintain mode can be set within a menu by selecting the menu switch SW6. Here, when the switching is performed by the mode dial SW2 as well, operability can be improved.

Figure 7A:
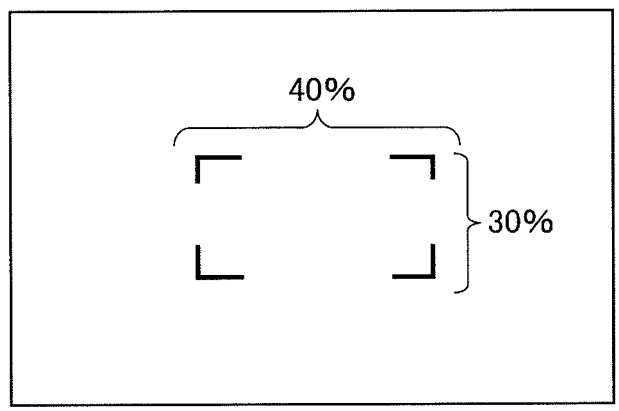
FIGS. 7A and 7B are views illustrating an AF mode.
Figure 7B:
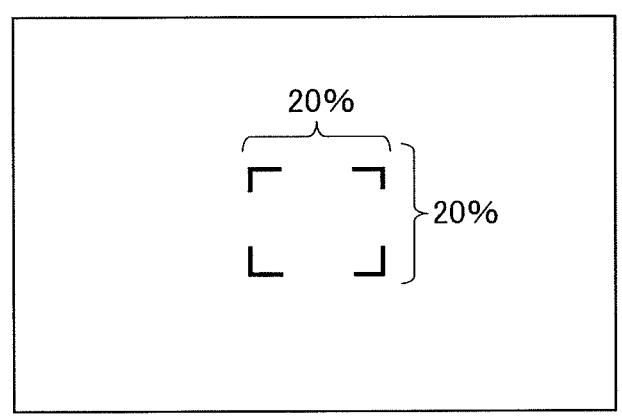

The AF evaluation value can be calculated from the digital RGB signals in a specific area. FIGS. 7A and 7B illustrate states of display on the LCD monitor 10 in the finder mode. Center frames in the display indicate AF areas of the digital camera. Here, the AF area during AF controlled by the release switch SW1 is different from that during AF controlled by the AF button switch SW15.

Figure 8A:
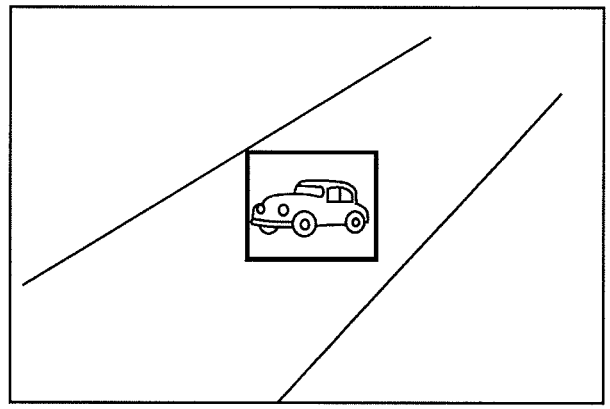
FIGS. 8A and 8B are views illustrating a finder when focusing.
Figure 8B:
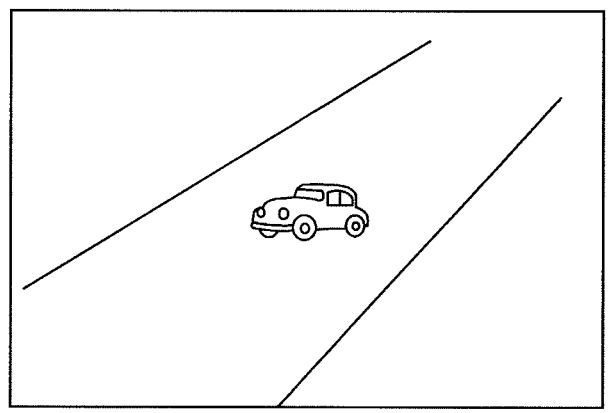

Switching can be performed between a normal AF mode controlled by the release switch SW1 and a spot AF controlled by the AF button. For example, in the normal AF mode, an area of the AF frame in the display measures 40% of the length of the display in the horizontal direction and 30% in the vertical direction, as illustrated in FIG. 7A. In the spot AF mode, the area represents 20% of the display in the horizontal direction and 20% in the vertical direction, as illustrated in FIG. 7B. In order to improve an operator's acknowledgement, the AF frame may be displayed (FIG. 8A) when an in-focus position is detected, while the AF frame is not be displayed (FIG. 8B) when an in-focus position is not been detected.

Next, a timing relationship between the driving of the focus lens 7-2a and the calculation of the AF evaluation value during AF processing is described. Driving of the focus lens 7-2a is performed by a predetermined focus drive amount in accordance with a single VD (Vertical Drive) signal. In a case that the focus motor 7-2b is a pulse motor, for example, the focus drive amount corresponds to the number of drive pulses. One focus lens driving sequence is completed by driving the focus lens 7-2a by the predetermined number of drive pulses at a predetermined pulse rate in accordance with a tailing edge of a VD signal pulse. The predetermined focus driving is performed again in accordance with a tailing edge of the subsequently output VD signal pulse. Thus, the focus driving is performed in synchronization with VD signals (i.e., frame cycle).

FIG. 9 is a timing chart indicating VD signals, focus drive timing of the focus lens 7-2a (see FIG. 4), timing of charge-sweeping pulses (SUB) for an electronic shutter, and exposure timing for image data captured at a frame rate of 30 fps.

As illustrated in FIG. 9, when a single VD signal is generated (see FIG. 9(a)), two pulses for driving the focus lens 7-2a are generated having the VD signal as a trigger (see FIG. 9(d)). Accordingly, the focus lens 7-2a is driven and moved by a drive amount corresponding to the two drive pulses. Further, the predetermined number of charge sweeping pulses (SUB) are generated having the VD signal as a trigger (see FIG. 9(b)), a process to sweep charges from the CCD 101 is performed in accordance with the number of the charge sweeping pulses (SUB).

Then, an exposure process is performed after the charge-sweeping process is completed (see FIG. 9(c)). An image of an object is captured as image data with the exposure process, and then, the AF evaluation value is calculated based on the image data. The number of the drive pulses may be varied in accordance with a focal length, a focus lens protruding amount (focus lens drive range), and the like. In this manner, the AF process in the present embodiment is performed within the drive range of the focus lens 7-2a and synchronized with the VD signals.

Regarding the complete flow of the AF process, the AF process with the release switch SW1 will be described using FIG. 10 and the AF process with the AF button switch SW15 will be described using FIG. 12.

Here, the following describes an AF operation performed when the camera is in the finder mode after being powered ON.

Figure 10:
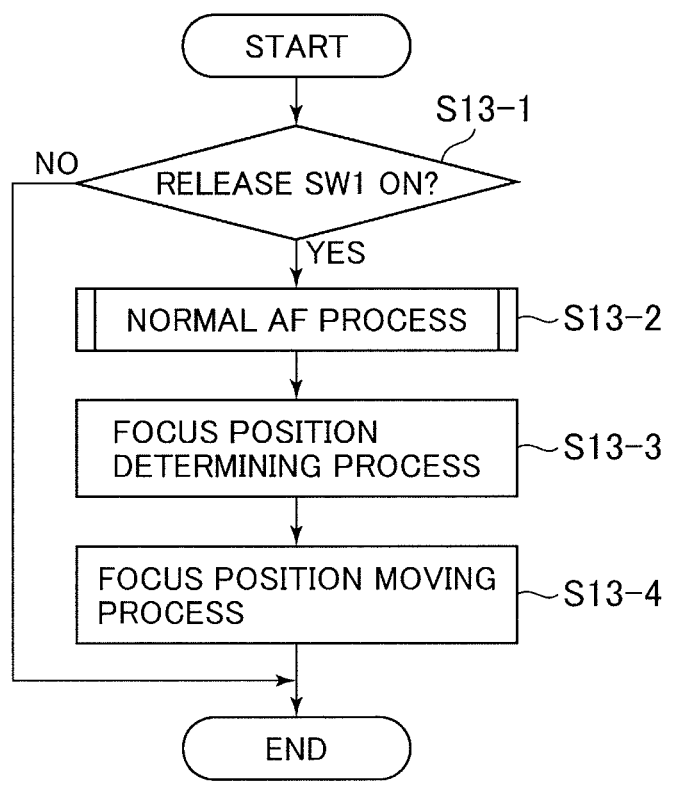
FIG. 10 is a flowchart of an AF process with a release switch SW1.

In FIG. 10, regarding the normal AF process with the release switch SW1, first, it is determined whether or not the release switch SW1 is depressed (S13-1). When the release switch SW1 is depressed (YES in S13-1), the normal AF process is performed (S13-2). The normal AF process is described using a flowchart of FIG. 11.

Figure 11:
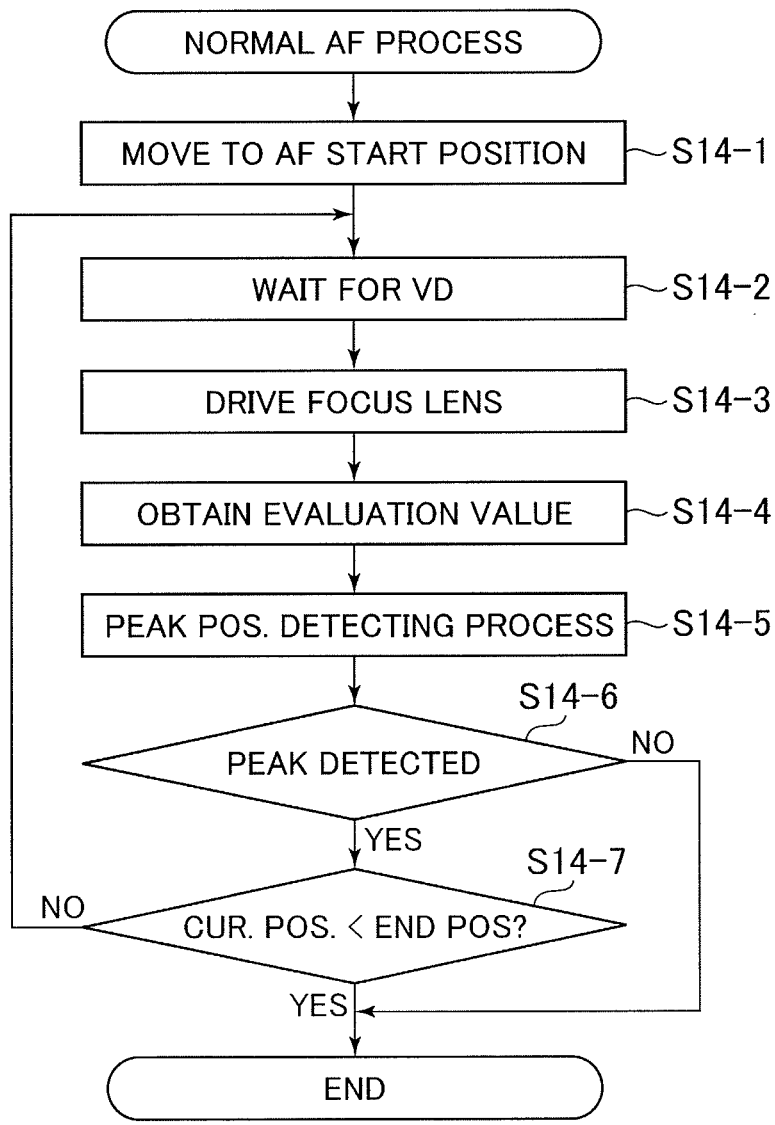
FIG. 11 illustrates a subroutine of the normal AF process of FIG. 10.

Referring to FIG. 11, first, the focus optical system 7-2 (see FIG. 4) is driven from a current position to an AF start position (S14-1). Here, the focus optical system 7-2 is moved to a relatively close position. The close position may be different for each optical system. In general, it is preferable to be moved in the neighborhood of 30 cm from the camera.

Next, the focus optical system 7-2 is driven to an infinity position at constant intervals. Here, a stepper motor is used as the focus motor 7-2b so that the focus lens is driven from 30 cm to the infinity position in steps, such as four pulses per each step. After waiting for the VD signal (S14-2), the focus lens 7-2a is moved (S14-3) and the AF evaluation value for the AF area is calculated (S14-4).

Next, a peak determination process is performed based on the calculated AF evaluation value. Here, a peak position is determined among the evaluation values while assessing the reliability of the AF evaluation values. In a case that a reliable peak position exists, the focus position thereof is accepted and stored as peak detection OK (AFOK). In a case that the peak position does not exist, it is assessed as focusing NG. In a case that a peak is not detected (i.e., focusing NG) (YES in S14-6), it is determined whether or not the current position is an end position (infinity position) (S14-7). When it is not the end position, the procedure returns to S14-2 and the process is repeated. On the other hand, in the case of peak detection OK (NO in S14-6) the procedure ends.

Next, returning to FIG. 10, a focus position determining process is performed (S13-3). When a peak is detected in the AF process, the detected peak position is determined to be the focus position. On the other hand, when a peak is not detected, an NG position is determined to be the focus position as AFNG. Here, the NG position denotes a position of the focus lens 7-2a where an object at a distance of about 2.5 m is in focus.

Lastly, a process to move the focus lens to the focus position is performed (S13-4). The AF process with the release switch SW1 is as described above. In FIG. 12, (a) and (b) indicate driving of the focus lens, a range thereof, and an evaluation value output result with the normal AF process.

<First Embodiment>

Figure 13:
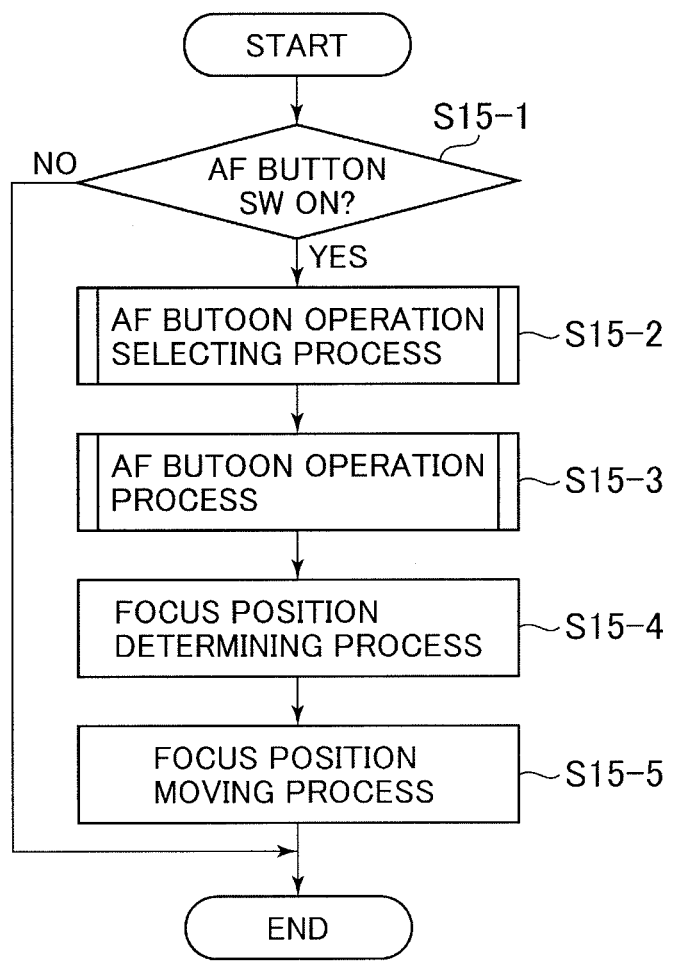
FIG. 13 is a flowchart of an AF process with an AF button SW.
Figure 14:
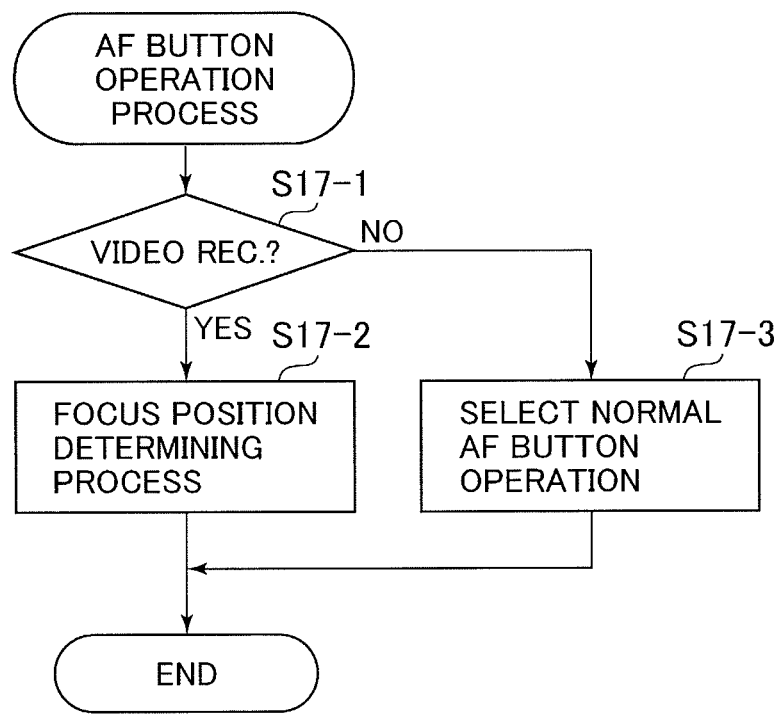
FIG. 14 illustrates a subroutine of an AF button operation selecting process in FIG. 13.

Referring to FIG. 13, an AF operation of a digital camera according to a first embodiment will be described. Regarding the AF process with the AF button switch SW15, first, it is determined whether or not the AF button switch SW15 is depressed (S15-1). When the AF button switch SW15 is depressed (YES in S15-1), it is determined in which state the AF button is depressed and an AF button operation selecting process to select an AF operation corresponding thereto is performed (S15-2). As illustrated in the flowchart of FIG. 14, according to the AF button operation selecting process, the operation varies in accordance with whether or not video recording is in effect. In a case in which video recording is in effect (YES in S17-1), an AF button operation for video recording is selected (S17-2), otherwise, a normal AF button operation is selected (S17-3).

Figure 16:
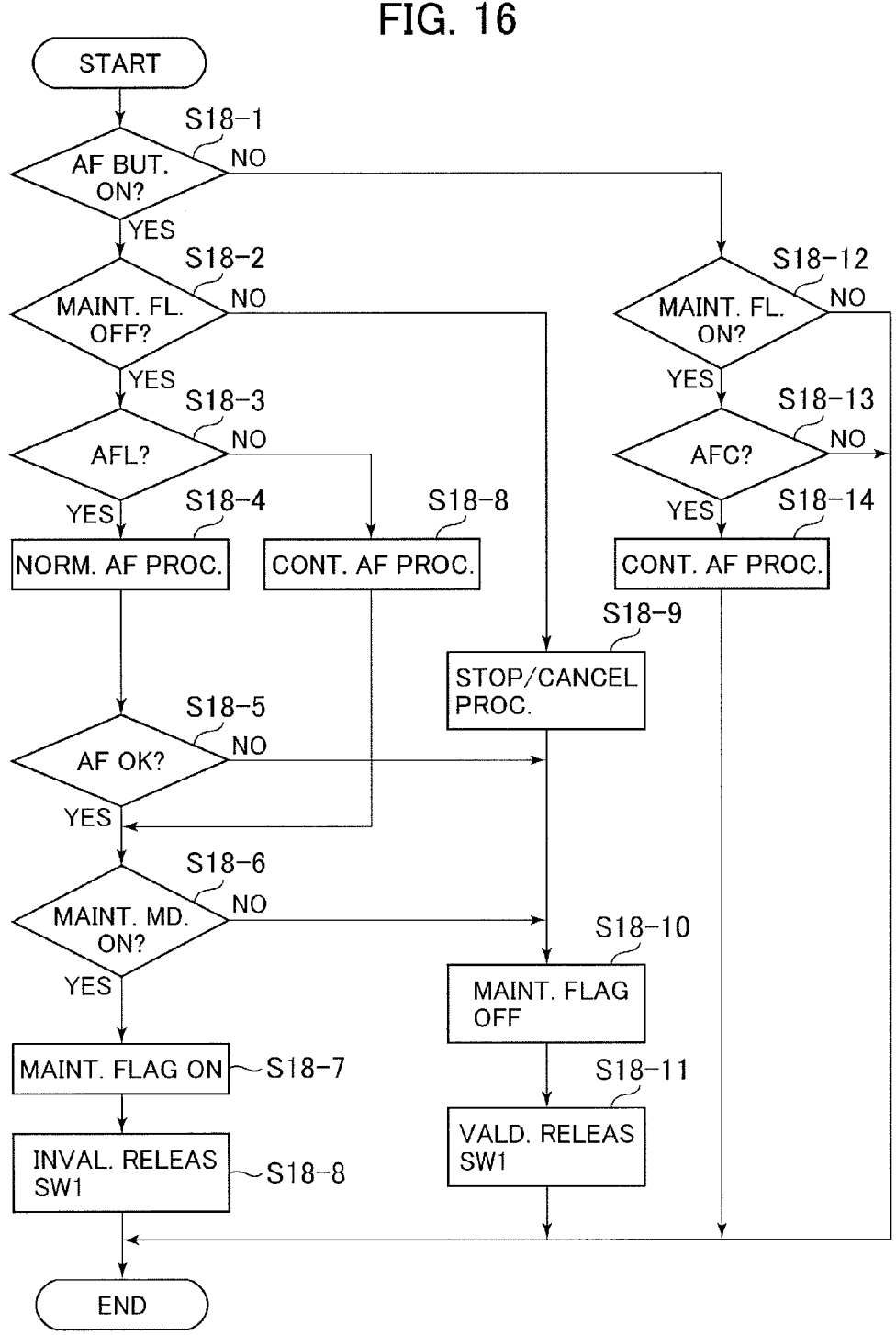
FIG. 16 illustrates a subroutine of the AF button operation process of FIG. 13.

When the AF button operation is selected (S15-3), the selected AF button operation process is performed (S15-3), as indicated in the flowchart of FIG. 13. FIG. 15 is an operational correspondence table for a case when the normal AF button operation is selected. As indicated in FIG. 15, the operation is determined to be continued or ended (stopped) after the AF button is released in accordance with whether or not the AF button is set to the maintain mode. The actual procedure is indicated in the flowchart of FIG. 16.

When the AF button is depressed (YES in S18-1) while a maintain flag is OFF (YES in S18-2) and the AF lever 15 is in the AFL position (YES in S18-3), the normal AF process, which is similar to the AF process activated by the release switch SW1, is performed (S18-4). In a case where the AF lever 15 is in the AFC position (NO in S18-3), a continuous AF process is performed (S18-8) in contrast. According to the continuous AF process, AF is not performed in the range of the normal AF process but instead in the vicinity of the current focus lens position. However, the basic operation is the same as that of the normal AF process in FIG. 11.

An operational chart of the continuous AF process is indicated in FIG. 12(b). The actual movement range is narrower than that of the normal AF process so that the AF evaluation values appear in the vicinity of a peak position as illustrated in FIG. 12(e). Therefore, the process can be completed rapidly by the amount thereof. As being continuously performed, the process is called continuous AF. When the maintain mode is ON (S18-6) after the normal AF process (S18-4) provides OK in AF (YES in S18-5) or after the continuous AF process is completed, the maintain flag is set to be ON (S18-7) and the release switch SW1 is invalidated (S18-8). Thus, the procedure ends. Otherwise, the maintain flag is set to be OFF (S18-10) and the release switch SW1 is validated (S18-11). Then, the procedure ends.

According to the above, when AF is OK at AFL, imaging can be performed in a state in which the focus position is locked (called AF lock). When at AFC, continuous AF can be performed regardless of depression of the release switch SW1. The above is indicated in FIG. 15 as ON states of (1) and (2) at maintain mode ON and states of (1) and (2) at maintain mode OFF.

Next, returning to S18-2, since AF lock or continuous AF has been under operation when the maintain flag is ON (NO in S18-2), a stop/cancellation process is performed and AF lock or continuous AF is stopped (S18-9). Subsequently, the maintain flag is set to OFF and the release switch SW1 is validated (S18-11). Then, the processing ends. The above is indicated in FIG. 15 as OFF states of (1) and (2) at maintain mode ON.

Figure 19:
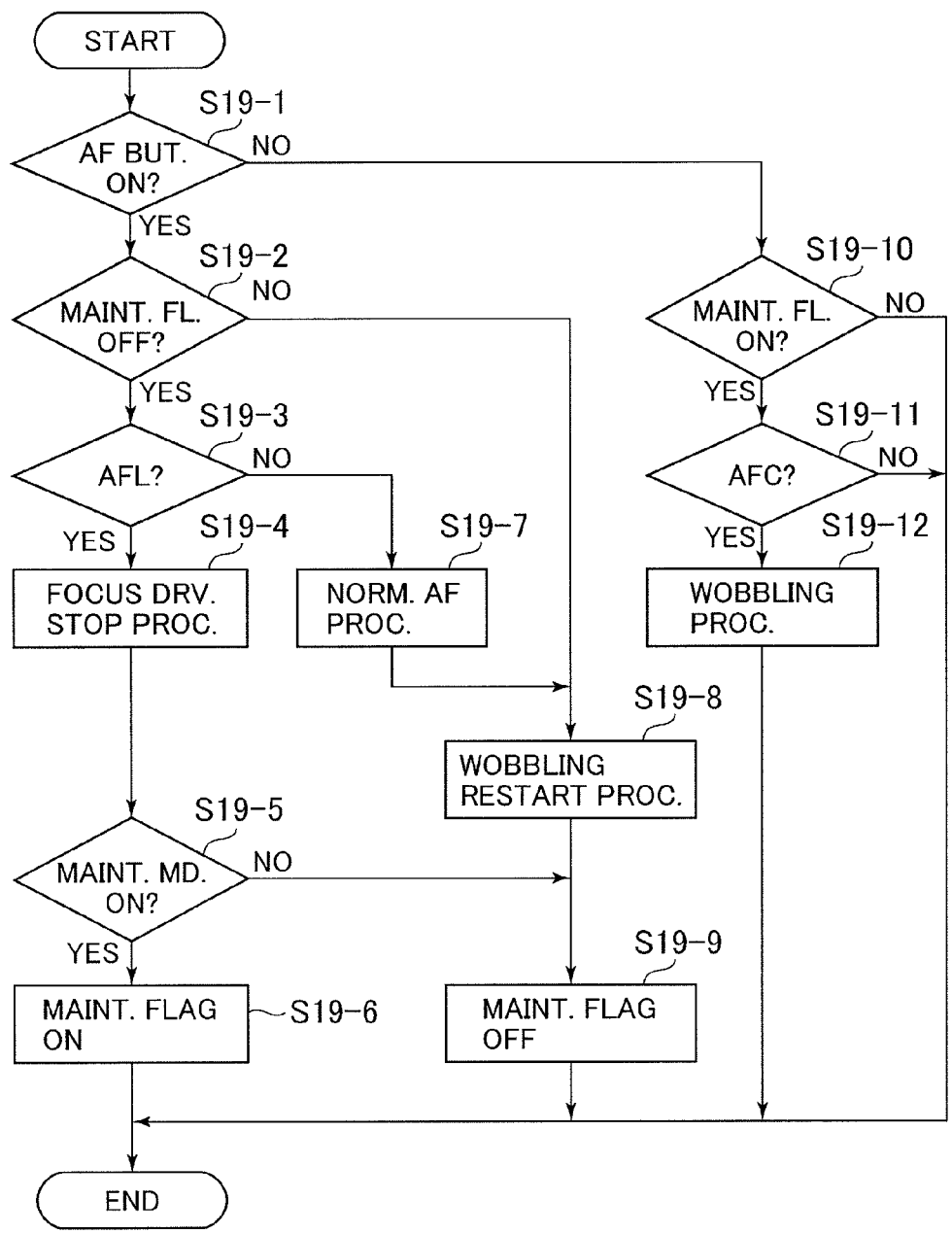
FIG. 19 is a flowchart of an AF button operation process during video recording according to the first embodiment of the present invention.

Even when the AF button is OFF in S18-1, continuous AF is performed (S18-14) when the maintain flag is ON (YES in S18-12) and the AF lever 15 is at AFC (YES in S18-13). The above is indicated in FIG. 15 as a state of (2). Otherwise, no process is performed as corresponding to states of (3) and (4) at maintain mode OFF in FIG. 15. FIG. 17 is an operational correspondence table regarding the AF button operation during video recording. As indicated in FIG. 17, the present embodiment is unique because operations are different between AFL and AFC, which is dissimilar from when the normal AF button operation is selected. The actual procedure is indicated in the flowchart of FIG. 19 which will be described later in detail.

Figure 18:
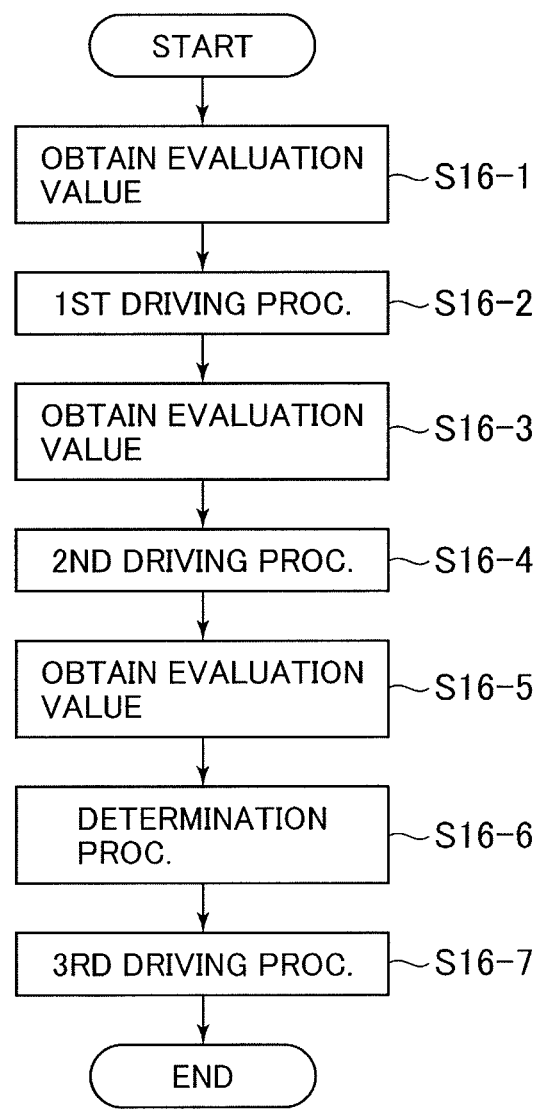
FIG. 18 is a flowchart of a wobbling process.

When a video is to be recorded, a wobbling operation is automatically started in advance. This is indicated by the flowchart of FIG. 18. First, an AF evaluation value is calculated based on a current focus position (S16-1). Next, predetermined pulse driving is performed toward a close position as a first driving procedure in the present embodiment (S16-2). The pulse amount is calculated as an amount to prevent angular field variation due to focus driving within one VD interval in finder mode, and as an amount to eliminate focus drive noise. In general, it is preferable that the amount is in the order of a half depth of field.

Then, an AF evaluation value is calculated for the position after the driving is completed (S16-3). Next, predetermined pulse driving is performed for focusing in a second driving procedure in an opposite direction, that is, toward an infinity position in the present embodiment (S16-4). Here, the driving is performed toward the infinity side at twice the pulse amount of the first driving procedure. Then, an AF evaluation value is calculated based on the position after the driving is completed (S16-5).

Subsequently, since three AF evaluation values are obtained by this stage, the position having the highest evaluation value is selected among the evaluation values and determined as a third drive position (S16-6). Lastly, driving is performed to the third position (S16-7) and the procedure ends. The above operation is repeated during video recording.

Figure 12:
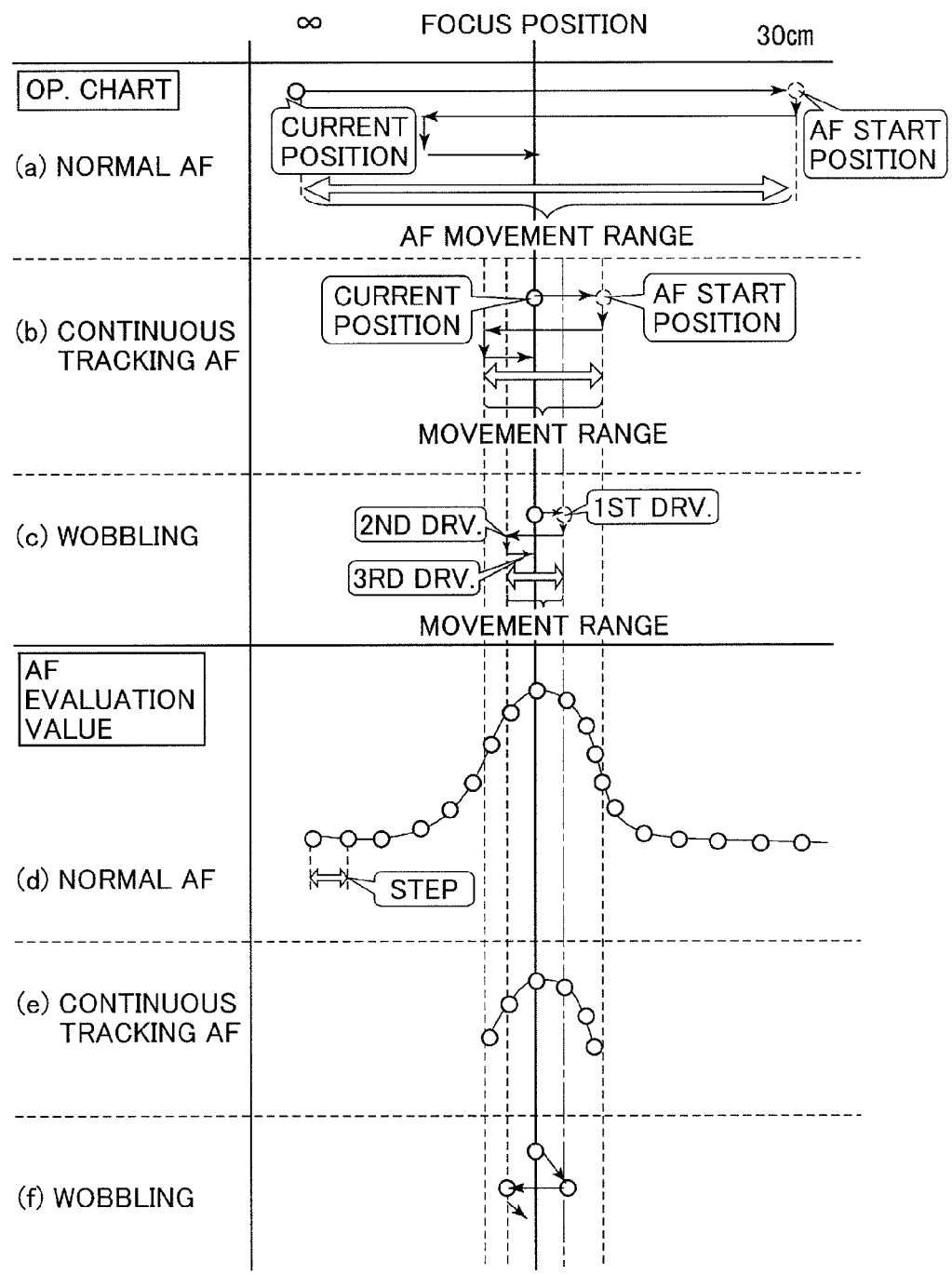
FIG. 12 is a view illustrating a relationship between a movement range of a lens and an AF evaluation value.

In FIG. 12, (c) and (f) indicate the operation and evaluation values for those positions. Since the number of the AF evaluation values is only three, it is the fastest process compared to the abovementioned normal AF and continuous AF processes. In addition, the operator cannot realize whether or not focus driving is performed. Accordingly, the above is a driving method that is generally adopted for a video camera. Video recording is started from the state in which the wobbling operation is performed.

Next, the AF button operation during video recording will be described with reference to the flowchart of FIG. 19. When the AF button is depressed (YES in S19-1) while a maintain flag is OFF (YES in S19-2) and the AF lever 15 is at AFL (YES in S19-3), a focus drive stopping process is performed (S19-4). This is used to set focusing to a fixed position such that the wobbling operation during video recording is stopped.

When the maintain mode is ON (YES in S19-5), the maintain flag is set to ON (S19-6) and the procedure ends. Otherwise, the maintain flag is set to OFF (S19-9) and the procedure ends. According, it is possible to quickly change focusing state during video recording to a fixed state when the operator desires. The above processes correspond to an ON state of (1) at maintain mode ON and a state of (1) at maintain mode OFF, which are indicated in FIG. 17. When the AF lever 15 is at AFC (NO in S19-3), a refresh normal AF process is performed (S19-7). This is for a case that the operator desires to intentionally use AF because of slow tracking with the wobbling operation, and the like. Subsequently, after AF is performed again, wobbling is restarted from the focus position (S19-8) and the maintain flag is set to OFF (S19-9). Then, the procedure ends. The above is indicated in FIG. 17 as a state of (2) at maintain mode ON and a state of (2) at maintain mode OFF.

Next, returning to S19-2, since focusing has been stopped when the maintain flag is ON (NO in S19-2), wobbling is restarted (S19-8). The above is indicated in FIG. 17 as an OFF state of (1) in maintain mode ON.

Returning to S19-1, when the AF button is OFF (NO in S19-1) while the maintain flag is ON (YES in S19-10) and the AF lever 15 is at AFL (NO in S19-11), no process is performed, since it is in the AF lock state. Otherwise, the wobbling process is continued (S19-12).

Next, returning to FIG. 13, a focus position determining process is performed (S15-4). In a case that a peak is detected in the AF process, the peak position is determined to be the focus position. In a case that a peak is not detected, an NG position is determined to be the focus position as AFNG. Here, the NG position denotes a position of the focus lens 7-2a where an object at a distance of about 2.5 m is in focus during the refresh normal AF process.

Lastly, a process to move the focus lens to the focus position is performed (S15-5). Here, since determining and driving have been performed during wobbling, determining of the focus position is not performed. The AF process controlled by the AF button SW is as described above.

Regarding the normal AF operation during video recording, there is a concern that focus drive noise could be recorded during video recording. Therefore, it is preferable that focus driving is decelerated so as to eliminate influence of the noise. The above is due to the focus lens system.

As described above, owing to changing an operation with the AF button during video recording, it becomes possible to quickly perform focus fixing and carry out an AF operation during video recording while improving operability. That is, owing to that an operation with the AF button is differentiated between video recording and still image recording, it becomes easy to further improve operability while actualizing an AF operation, which is required during each recording. That is, it is possible to provide an imaging apparatus which is user-friendly during, before and after video recording and during still image recording or capturing.

<Second Embodiment>

Next an operation of a digital camera according to a second embodiment will be described. Referring to FIG. 13, in regard to the AF process with the AF button switch SW15, it is first determined whether or not the AF button switch SW15 is depressed (S15-1). When the AF button switch SW15 is depressed (YES in S15-1), the state in which the AF button is depressed is determined so that the AF button operation selecting process can select an AF operation corresponding to that particular state (S15-2).

As illustrated in the flowchart of FIG. 14, according to the AF button operation selecting process, the operation varies in accordance with whether or not video recording is in effect. In a case of video recording (YES in S17-1), the AF button operation during video recording is selected, otherwise, the normal AF button operation is selected (S17-3). After the AF button operation is selected, the selected AF button operation process is performed (S15-3).

The table in FIG. 15 corresponds to a case where the normal AF button operation is selected. As indicated in FIG. 15, the operation is determined to be continued or ended (stopped) after the AF button switch SW15 is released in accordance with whether or not the AF button is set to maintain mode. The actual procedure is indicated by the flowchart of FIG. 16. Since the above is the same as the first embodiment, detailed description thereof will not be repeated.

Figure 21:
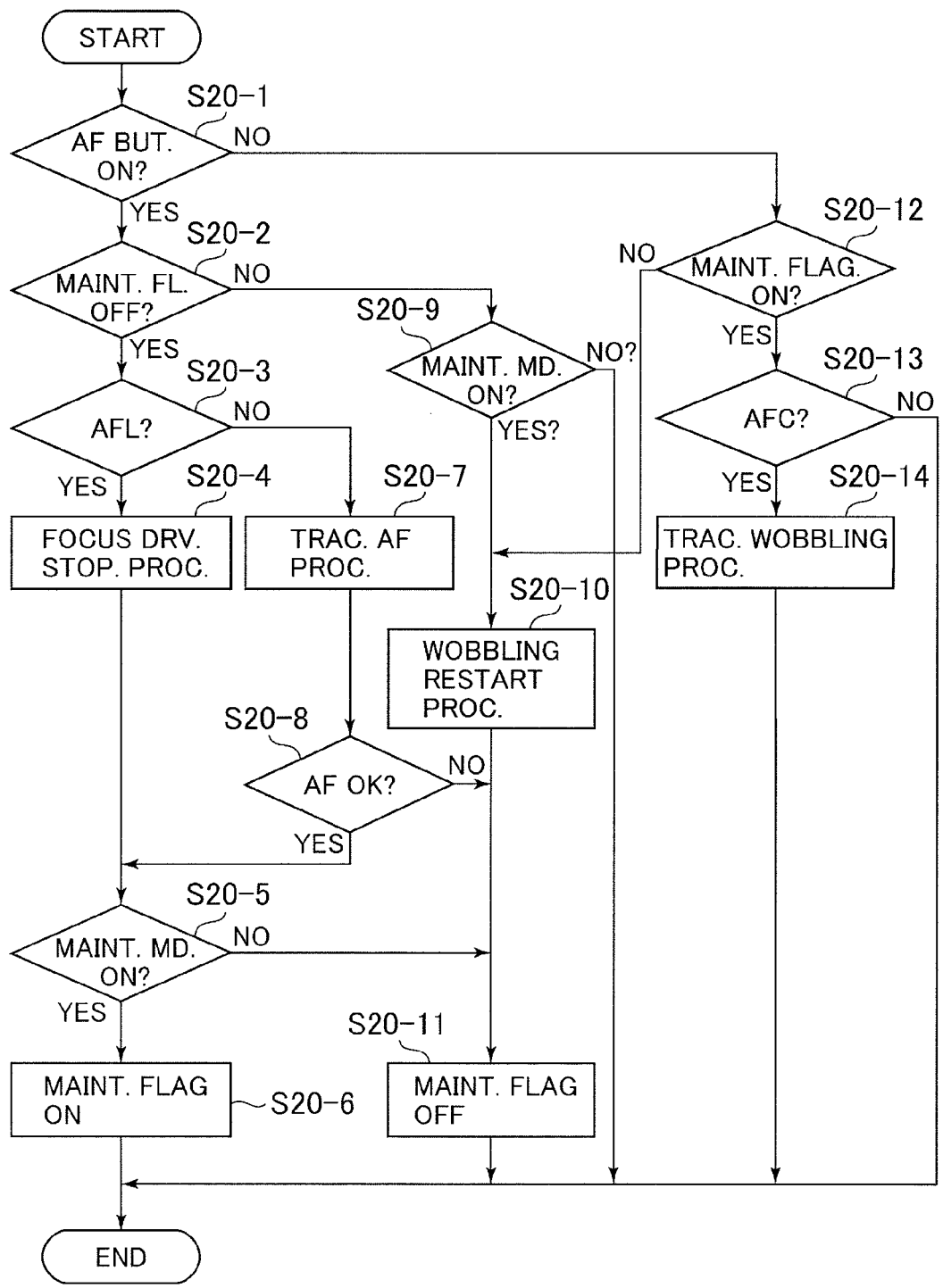
FIG. 21 is a flowchart of an AF button operation process during video recording according to the second embodiment.
Figure 24A:
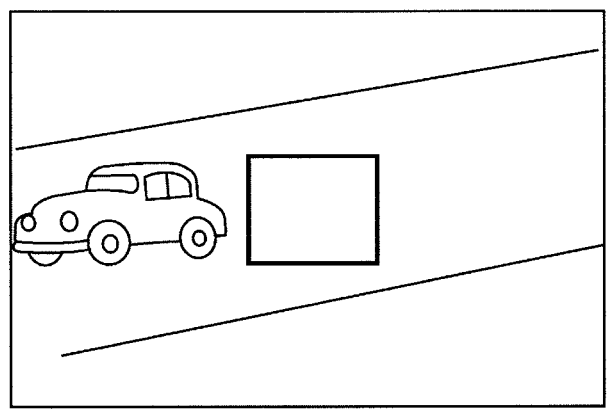
FIGS. 24A and 24B are views illustrating a conventional AF operation.
Figure 24B:
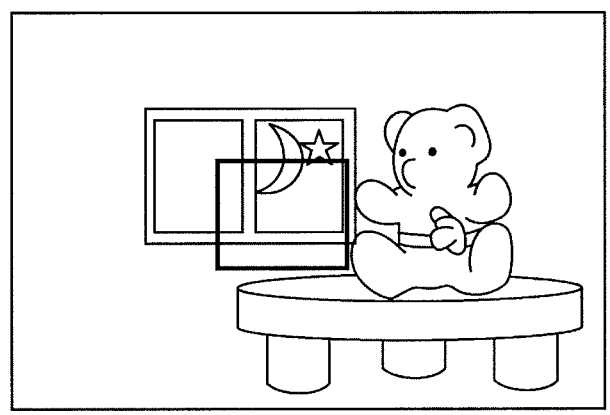

The table in FIG. 20 corresponds to the AF button operation during video recording. As indicated in FIG. 20, the present embodiment is unique in that operations are different between AFL and AFC from when the normal AF button operation is selected. The actual procedure is indicated by the flowchart of FIG. 21.

Next, when a video is to be recorded when the AF button operation during video recording is selected, a wobbling operation is automatically started in advance. This is indicated by the flowchart of FIG. 18. Since the above is the same as the first embodiment, a detailed description thereof will not be repeated.

Next, the AF button operation during video recording will be described with reference to the flowchart of FIG. 21. When the AF button is depressed (YES in S20-1) while a maintain flag is OFF (YES in S20-2) and the AF lever 15 is at AFL (YES in S20-3), a focus drive stopping process is performed (S20-4). This is to set focusing to a fixed state while stopping driving of the wobbling operation during video recording. The above is indicated in FIG. 20 as states of (1) in maintain mode ON and OFF.

When AF lever 15 is at AFC (NO in S20-3), a tracking AF process is performed (S20-7). This is for a case that the operator desires to intentionally use AF because of slow tracking with the wobbling operation, and the like. Here, further tracking of an object is effective when changing composition during video recording.

In tracking AF, continuous AF is performed while an AF area tracks an object. Regarding the object tracking, it is determined whether or not motion of an object image is detected. A variety of technologies have been proposed for motion detecting. Here, a template matching process is performed as follows. In the template matching process, a search is conducted where image data for a tracking target (e.g., image data in a range of an AF area in FIG. 22(a)) appears in image data of the next frame.

Here, consideration is given to a case in which the object moves as illustrated in FIG. 22(b). FIG. 23 illustrates a range and a direction of the position searching. A template is moved vertically, horizontally, and obliquely within a range which that is divided into six by six sections. Then, a position having the highest degree of coincidence with the image data is determined to be a moved position. FIG. 23(c) illustrates a position detected after the movement.

As described above, a variety of tracking methods have been proposed. Therefore, there is a possibility to perform the process faster by using, for example, a pattern coincidence method with boosting algorithm instead of calculating an image data difference described above. Thus, it is possible to actualize tracking AF by performing continuous AF with a tracking area in the vicinity of an object tracked.

Returning to FIG. 21, when the tracking AF result is OK (YES in S20-8) and when the maintain mode is ON (YES in S20-5) the maintain flag is set to ON (S20-6). Then, the procedure ends. On the other hand, when the tracking AF result is NG (NO in S20-8), the maintain flag is set to OFF (S20-11) and the procedure ends. The above is indicated in FIG. 20 as a state of (2) in maintain mode ON and a state of (2) in maintain mode OFF.

Next, returning to S20-2, when the maintain flag is ON (NO in S20-2) and the maintain mode is ON (YES in S20-9), since focusing has been stopped at AFL and the wobbling process is under operation in the tracking area at AFC, normal wobbling is restarted (S20-10) and the maintain flag is set to OFF (S20-11). Then, the procedure ends. Here, no process is performed except for "restart (REST)" and "cancel (CANC)" of (1) and (2) in maintain mode ON in FIG. 20.

Next, returning to S20-1, when the AF button is OFF (NO in S20-1) while the maintain flag is ON (YES S20-12) and the AF lever 15 is at AFL (NO in S20-13), no process is performed, since it is in the AF lock state. When the AF lever 15 is at AFC (YES in S20-13), the wobbling process is continued with the AF area tracking (S20-14).

When the maintain flag is OFF (NO in S20-12), wobbling is restarted (S20-10) and the maintain flag is set to OFF (S20-11). Then, the procedure ends. The above is indicated in FIG. 20 as states (3) and (4) in maintain mode OFF.

Next, returning to FIG. 13, a focus position determining process is performed (S15-4). When a peak is detected in the AF process, the peak position is determined to be the focus position. However, when a peak is not detected, an NG position is determined to be the focus position as AFNG. Here, the NG position denotes a position of the focus lens 7-2a where an object at a distance of about 2.5 m is in focus during refresh normal AF.

Lastly, a process to move the focus lens to the focus position is performed (S15-5). Here, since determining and driving have been performed during wobbling, determining of the focus position is not performed. The AF process with the AF button SW is as described above.

As described above, by changing operations with the AF button during video recording, it becomes possible to quickly fix focusing in an AF operation during video recording while improving operability. Further, in the present embodiments, since an object may move during video recording, tracking with an AF area in the continuous AF and the like are performed during video recording. Accordingly, focusing is facilitated without moving a camera or shifting a screen.

Thus, owing to that an operation with the AF button is differentiated between video recording and still image recording, it becomes easy to further improve operability while actualizing an AF operation, which is required during each type of recording. That is, it is possible to provide an imaging apparatus which is user-friendly during, before and after video recording and during still image recording.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2013-017633 (filed on Jan. 31, 2013), which is expressly incorporated herein, by reference, in its entirety.

The invention claimed is:

1. An imaging apparatus, comprising:
   an image sensor that receives light from an object through an imaging lens;
   a lens driver that moves the imaging lens; and
   an automatic focus detector that determines an in-focus lens position based on imaging data obtained from the image sensor;
   the automatic focus detector being capable of performing a focus detection operation with a second switch that is distinct from a release switch, the second switch includes a video focus detector and a still-image focus detector, and the video focus detector further includes a focus detection operation selector that varies the focus detection operation controlled by the second switch in accordance with whether a video is being recorded.

2. The imaging apparatus according to claim 1, wherein the video focus detector of the automatic focus detector includes a wobbling operation that continuously performs an AF operation during video recording.

3. The imaging apparatus according to claim 1, wherein during video recording, movements made by the lens driver can be selected from among operations of stopping, restarting and refreshing a focus detection operation.

4. The imaging apparatus according to claim 3, wherein a lever is arranged in a vicinity of the second switch to enable selection of any of the operations with the lens driver corresponding to a position of the lever.

5. The imaging apparatus according to claim 4, wherein wobbling is restarted from a focus position obtained by a normal AF operation as being capable of performing the normal AF operation when a continuous AF function, to continuously perform an AF operation, is set by the lever.

6. The imaging apparatus according to claim 3, wherein during still-image recording, movements made by the lens driver include a normal AF operation and a continuous AF operation.

7. The imaging apparatus according to claim 1, further comprising a discrete switch activation detector that performs exclusive switching each time the second switch is depressed, wherein stopping, restarting or refreshing a focus detection operation is performed in accordance with a depression of the second switch.

8. The imaging apparatus according to claim 1, wherein a track focus detection operation is performed by obtaining image data while moving the imaging lens in a range of the vicinity of an object as tracking the object in the image data when performing a fresh focus detecting.

9. The imaging apparatus according to claim 1, wherein a lever is provided in a vicinity of the second switch, and selection of a plurality of operations of the lens driver is performed in accordance with positions of the lever.

10. The imaging apparatus according to claim 1, wherein, during a still image recording operation, operations of the lens driver include a normal AF operation and a continuous AF operation.

11. An imaging apparatus, comprising:
an image sensor that receives light from an object through an imaging lens;
a lens driver that moves the imaging lens;
an automatic focus detector that determines an in-focus lens position based on imaging data obtained from the image sensor,
the automatic focus detector being capable of performing a focus detection operation with a second switch that is different from a release switch, the second switch includes a video focus detector and a still-image focus detector, and the video focus detector further includes a focus detection operation selector that varies the focus detection operation controlled by the second switch in accordance with whether a video is being recorded; and
a continuous switch activation detector that determines whether or not the second switch is continuously depressed, wherein stopping, restarting or refreshing a focus detection operation is performed in accordance with a focus detection state when the second switch is continuously depressed.

12. The imaging apparatus according to claim 11, wherein the video focus detector includes a wobbling operation that continuously performs an AF operation during video recording.

13. The imaging operation according to claim 11, wherein a track focus detection operation is performed by obtaining image data while moving the imaging lens in a range of a vicinity of an object as tracking the object in the image data when performing a fresh focus detection.

14. An imaging apparatus, comprising:
an image sensor that receives light from an object through an imaging lens;
a lens driver that moves the imaging lens;
an automatic focus detector that determines an in-focus lens position based on imaging data obtained from the image sensor,
the automatic focus detector being capable of performing a focus detection operation with a second switch that is different from a release switch, the second switch includes a video focus detector and a still-image focus detector, and the video focus detector further includes a focus detection operation selector that varies the focus detection operation controlled by the second switch in accordance with whether a video is being recorded,
a switch detector that selects whether or not to perform a process with a discrete switch activation detector, which performs exclusive switching each time the second switch is depressed, or with a continuous switch activation detector, which determines whether or not the second switch is continuously depressed.

15. The imaging apparatus according to claim 14, wherein the video focus detector includes a wobbling operation that continuously performs an AF operation during video recording.

16. The imaging apparatus according to claim 14, wherein a track focus detection operation is performed by obtaining image data while moving the imaging lens in a range of a vicinity of an object as tracking.

* * * * *